(12) United States Patent
Gonnet (10) Patent No.: US 10,467,276 B2
(45) Date of Patent: Nov. 5, 2019

(54) SYSTEMS AND METHODS FOR MERGING ELECTRONIC DATA COLLECTIONS

(71) Applicant: CEEQ IT CORPORATION, Waterloo (CA)

(72) Inventor: Gaston Henry Gonnet, Waedenswil (CH)

(73) Assignee: CEEQ IT CORPORATION, Waterloo (CA)

( * ) Notice: Subject to any disclaimer, the term of this patent is extended or adjusted under 35 U.S.C. 154(b) by 211 days.

(21) Appl. No.: 15/417,768

(22) Filed: Jan. 27, 2017

(65) Prior Publication Data

US 2017/0220665 A1    Aug. 3, 2017

Related U.S. Application Data

(60) Provisional application No. 62/288,226, filed on Jan. 28, 2016.

(51) Int. Cl.
*G06F 16/00* (2019.01)
*G06F 16/35* (2019.01)

(52) U.S. Cl.
CPC .................... *G06F 16/35* (2019.01)

(58) Field of Classification Search
CPC ......... G06F 17/30598; G06F 17/30324; G06F 17/30327; G06F 17/30; G06F 16/35; G06F 16/00; G06G 17/30705
See application file for complete search history.

(56) References Cited

U.S. PATENT DOCUMENTS

| | | | |
|---|---|---|---|
| 6,167,398 A * | 12/2000 | Wyard | G06F 17/30687 707/E17.079 |
| 7,158,983 B2 | 1/2007 | Willse et al. | |
| 7,519,590 B2 | 4/2009 | Chandrasekar et al. | |
| 7,555,523 B1 * | 6/2009 | Hartmann | H04L 51/12 709/206 |
| 8,005,782 B2 | 8/2011 | Reznik et al. | |
| 9,456,000 B1 * | 9/2016 | Spiro | H04L 51/12 707/E17.009 |
| 2003/0026268 A1 * | 2/2003 | Navas | H04L 29/12009 370/400 |
| 2004/0059736 A1 * | 3/2004 | Willse | G06F 17/27 707/E17.094 |
| 2007/0106662 A1 * | 5/2007 | Kimbrough | G06F 16/353 707/E17.09 |

(Continued)

*Primary Examiner* — Anh Ly
(74) *Attorney, Agent, or Firm* — Norton Rose Fulbright Canada LLP (57) ABSTRACT

The present disclosure, in some embodiments, describes a system for classifying members of a collection of texts into clusters to generate merged data collections. A member text can range from a single document to the contents of a column in a database table. The classification may indicate and/or provide an estimation as to which documents or columns are most closely similar to each other, without making any assertion about the actual contents of the document or column. In some embodiments, a system may include counting some characteristic of the text. The characteristic may be chosen such that each text produces a set of counts. A statistical measure is then applied to determine the similarity of sets of counts associated with each pair of texts.

20 Claims, 4 Drawing Sheets

(56) References Cited

U.S. PATENT DOCUMENTS

| | | | |
|---|---|---|---|
| 2008/0270342 A1* | 10/2008 | Ruehle | G06F 17/30985 |
| | | | 707/E17.001 |
| 2009/0080635 A1* | 3/2009 | Altberg | G06Q 30/02 |
| | | | 379/216.01 |
| 2009/0113246 A1* | 4/2009 | Sabato | G06F 11/0769 |
| | | | 714/37 |
| 2009/0128302 A1* | 5/2009 | Srinivasan | G01S 5/0009 |
| | | | 340/10.6 |
| 2010/0145678 A1* | 6/2010 | Csomai | G06F 17/241 |
| | | | 704/9 |
| 2010/0169758 A1* | 7/2010 | Thomsen | G06F 17/246 |
| | | | 715/212 |
| 2011/0213655 A1* | 9/2011 | Henkin | G06Q 30/00 |
| | | | 705/14.49 |
| 2012/0316916 A1* | 12/2012 | Andrews | G06Q 40/08 |
| | | | 705/7.28 |
| 2013/0212111 A1* | 8/2013 | Chashchin | G06F 17/30707 |
| | | | 707/740 |
| 2014/0280173 A1* | 9/2014 | Scholtes | G06N 7/005 |
| | | | 707/740 |
| 2015/0006528 A1* | 1/2015 | Rao | G06F 17/30705 |
| | | | 707/730 |
| 2016/0048587 A1* | 2/2016 | Scholtes | G06N 7/005 |
| | | | 706/11 |
| 2016/0344758 A1* | 11/2016 | Cohen | G06F 3/0482 |
| | | | 707/E17.002 |
| 2016/0371261 A1* | 12/2016 | Cormack | G06N 20/00 |
| 2017/0220665 A1* | 8/2017 | Gonnet | G06F 16/35 |

* cited by examiner

SYSTEMS AND METHODS FOR MERGING ELECTRONIC DATA COLLECTIONS

FIELD

The present disclosure generally relates to the field of information clustering, and more specifically, the automated classification of information into clusters.

INTRODUCTION

Information classification is a major issue for many large and/or complex organizations. Information may be provided (e.g., received, arrived, calculated, processed, determined) in various forms, such as physical correspondence, electronic correspondence, electronic documents, among others. Furthermore, information may be provided without classification, and given a large enough volume of information (and/or quantity of documents), there may be various advantages associated with determining and/or estimating classifications such that the information may be clustered and/or grouped based on various criteria.

SUMMARY

In accordance with an aspect, a computer-implemented system configured to merge electronic data collections using an automated approximate classification of a plurality of electronic information elements, each electronic information element of the plurality of electronic information elements having one or more machine encoded characteristics is provided.

The computer-implemented system, in some embodiments is provided in the form of an automated clustering engine that performs an approximate classification using extracted encoded information that is processed into count vectors and populated into a topology of a tree using determinations based on the count vectors. The clustering and classification may be approximate as the system is designed to operate free of context (e.g., assertions) relating to the content of the electronic information.

The system includes one or more processors, having one or more non-transitory computer readable memories and data storage, the non-transitory computer-readable media memories including electronic instructions. The electronic instructions cause the processors to receive the plurality of electronic information elements from a data source, extract the one or more machine encoded characteristics from each one of the electronic information elements, provision a plurality of count vectors based at least on the extracted machine encoded characteristics, each of count vector of the plurality of count vectors corresponding to one of the electronic information elements, estimate one or more distances based on statistical measures between each pair of count vectors, generate a matrix of the distances based on statistical measures between each pair of count vectors; and generate a topology or tree, having a plurality of nodes and a plurality of linkages between those nodes, wherein each node represents an electronic information element and each linkage is adapted based on the aforementioned estimated distances based on statistical measures.

The plurality of linkages and the plurality nodes are generated and arranged in the topology such that one or more clusters of electronic information elements may be identified, each such cluster indicative of determined similarities between the electronic information elements composing the cluster free of assertions relating to content associated with each electronic information element.

The system is then configured to apply the automated approximate classification to each of the electronic information elements to facilitate a reduction in downstream processing complexity.

In some embodiments, the system is provided as a plug-in or peripheral computing component that is adapted for receiving inputs and providing outputs in accordance with a larger document management/processing system. The system can be utilized to provide a "first pass" classification based on count vectors, where further downstream processing can be utilized to validate and/or refine the classifications using other computational mechanisms, or to initiate various workflows.

For example, the system may be provided as a hardware device or appliance that can be operatively connected in a data centre that is specifically configured to perform a "first pass" classification/clustering of electronic information elements. In other embodiments, the system may be provided in the form of a cloud-based implementation using distributed computing resources in concert to conduct clustering identifications.

In accordance with one aspect, there is provided a computer-implemented method for merging electronic data collections using an automated approximate classification of electronic information elements, each such electronic information element having one or more machine encoded characteristics, the method comprising:

receiving the electronic information elements from a data source;

extracting the one or more machine encoded characteristics from each one of the electronic information elements;

provisioning a plurality of count vectors based at least on the extracted machine encoded characteristics, each of those count vectors corresponding to one of the electronic information elements;

estimating one or more distances based on statistical measures between each pair of the count vectors;

generating a matrix of the distances based on statistical measures between each pair of count vectors; and generating a topology or tree, having a plurality of nodes and a plurality of linkages between those nodes, wherein each node represents an electronic information element and each linkage is adapted based on the aforementioned estimated distances based on statistical measures;

wherein the linkages and the nodes are generated and arranged in the topology such that one or more clusters of electronic information elements may be identified, each such cluster indicative of determined similarities between the electronic information elements composing the cluster free of assertions relating to content associated with each electronic information element, and applying the automated approximate classification to each of the electronic information elements to facilitate a reduction in downstream processing complexity.

The method may, as for example, involve receiving as input multiple electronic document collections and provides as output an ontology or merged or aggregated electronic document collection to provide tangible results, such as a categorization of the document and the relationships therein.

In another aspect, each electronic information element is a document, column or field.

In another aspect, automatically estimating the one or more distances based on statistical measures between each of the pairs of count vectors includes using at least a chi-squared goodness of fit statistic.

In another aspect, the method further comprises: comparing the topology and the one or more clusters against a reference database indicative of a reference standard.

In another aspect, the topology is adapted to identify the one or more clusters by grouping nodes having a distance based on statistical measures between the nodes below a pre-defined threshold distance.

In another aspect, the one or more extracted machine encoded characteristics includes at least counts of characters.

In another aspect, the one or more extracted machine encoded characteristics are n-grams (bigrams when n=2, trigrams when n=3, tetragrams when n=4, or n-grams generally for other values of n).

In another aspect, the one or more extracted machine encoded characteristics are discrete logarithmic encodings of the length or discrete logarithmic encodings of any numerical content of the element.

In another aspect, generation of the topology or tree involves using methods from bioinformatics, such as from the DARWIN (Data Analysis and Retrieval With Indexed Nucleotide/peptide sequences) system.

In various further aspects, the disclosure provides corresponding systems and devices, and logic structures such as machine-executable coded instruction sets for implementing such systems, devices, and methods. The systems receive as input multiple electronic document collections and provide as output a merged or aggregated electronic document collection to provide tangible results.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Embodiments described herein relate to systems and methods for merging electronic document collections using electronic classification techniques for processing electronic information elements or metadata about the electronic documents in the electronic document collections. The systems receive as input multiple electronic document collections and provides as output a merged or aggregated electronic document collection to provide tangible results. In the context of classifying documents, in a collection of documents there may be many different styles and/or topics represented.

The embodiments described operate by controlling processors linked to one another that are utilized to electronically track and cluster electronic documents or other electronic information. Electronic document collections that voluminous lead to difficulties in efficient processing (e.g., traversing, searching, modification, storage, transformation), even with the aid of automated mechanisms. In particular, pre-processing may be utilized to decrease the difficulty of the task, and a computationally heuristic approach is described below.

Clusters can be identified, for example, by way of modification of the files themselves (e.g., modifying/appending header information), adding metadata tags, storing clustering information on an external database for quick reference, among others (e.g., an associative array, hash table/hash tree, pointers).

It may be desirable to have an efficient, automated way of separating large collections into clusters of similar documents to eliminate duplicates or redundancy which may improve memory usage and processing efficiency. This may also facilitate searching for and retrieval of similar documents which may also improve search processing efficiency. For example, an overall "search space" may be reduced, whereby an otherwise computationally difficult process can be more focused on a tightly defined "search space" that may be more likely to contain the desired electronic item. Clustering is time-consuming, processor and resource intensive, and specific improvements are described herein to provide technical improvements to a mechanism that performs an automated approximate classification free of human intervention.

Electronic documents is an example application and other electronic items may also be processed by the systems and methods. In the context of classifying columns in a relational database, a typical enterprise database may have a number (e.g., hundreds or even thousands of tables), each table having a number (e.g., dozens) of columns and/or records.

In an embodiment, a method for merging electronic document collections using electronic classification techniques is provided. The method may begin, for example, by receiving data in the form of with documents, of various types. In other embodiments, the received data may be provided in the form of, columns or fields of databases.

The received data is processed to extract elements of information, and to form count-vectors. These count-vectors are formed with at least one of n-grams (e.g., bigrams, trigrams, tetragrams), other measures of text, discrete logarithmic encodings of the length, discrete logarithmic encoding of the value (when it is numeric). Other types of techniques may be utilized to form the count-vectors.

The count-vectors may be utilized, for example, to identify a class of documents/column/field in databases. For every pair of count-vectors, a distance may be computed, using chi-square or another statistical measure. For example, the maximum likelihood G test may be used for computation of the distance. Statistical measures, e.g. chi-square or G-likelihood test, can measure if two samples of values (or more than two samples) come from the same source. The value of the statistical test is larger when the samples do not come from the same source and it is smaller when they come from the same source. In this way, the value of the statistical test can be used as a distance between then count vectors and hence as a distance between the corresponding columns.

Count vectors can be utilized to expedite and improve processing of the elements of information. The extracted information is transformed into a compressed string representative of possibilities of n-grams, among other methods. The compressed string can be used to identify a class of documents/columns/fields in databases. The count vectors can used to estimate distances based on statistical measures. Accordingly, embodiments described herein can involve estimating one (or more) distances between the columns by running statistical tests on the corresponding count vectors of the columns. The statistical tests, for example chi-square, can measure how different the count vectors are or how different the columns are, for example.

For every pair of count-vectors, a distance may be computed, using chi-square or another statistical measure. For example, the maximum likelihood G test may be used for computation of the distance. This distance may be utilized in performing classifications to form groupings 104 (e.g., clusters) based on identified similarities between aspects of information. The distances based on statistical measures can be input or provided in the form of a distance matrix. For a group of documents, the pairs of distances is arranged in a matrix of distances (e.g., an all-against-all matrix of distances). For example, the distance matrix can be used to store a similarity space that can be used for future rapid access to the information (e.g., searching) or cluster identification.

From the distance matrix, a tree may be computed using various methods (e.g., akin to those utilized in bioinformatics implemented in the Darwin system). The tree may be computed to depict various groups of similar electronic information elements (e.g., documents, columns, or fields). This tree is shown visually, in an example at FIG. 3. Different types of trees are usable. In some embodiments, phylogenetic trees are utilized, generated from a neighbor joining algorithm. A tree structure can be advantageous as the tree structure itself stores information relevant to hierarchical classifications, etc., and computational benefits may be obtained through an efficient traversal of the tree structure. For example, it may be structured such that only a portion of the tree may need to be traversed to identify a specific cluster or sub-cluster.

From these tree(s), an (approximate) ontology may be extracted, illustrative of the electronic information elements (e.g., documents, columns, or fields). In some embodiments, further data or metadata may be added (e.g., appended) or otherwise incorporated into the receiving data, indicative of various classifications or outputs as provided or estimated by the ontology/tree topology. For example, the additional data/metadata may be utilized to establish that received data (e.g., documents/columns/fields) which are have a level of similarity can be treated together or in a similar manner. For example, a level of similarity may be determined through the application of a threshold or a pre-defined threshold, above which documents may be deemed similar, and such similarities may be utilized for the purpose of searching, integrating, transformation, etc.

A typical enterprise may have dozens (or greater volumes) of individual databases and electronic documents, and anyone wishing to merge together the data for separate organizations, or even separate lines of business within a single organization may be required to first understand the structure of the existing databases and collections. If each database or collection is well documented, this may be a tedious but realistic task.

If some (e.g., any, all) the databases are undocumented this task may become extremely challenging and complex, and in some scenarios, unreasonable from a resource and labor perspective. The process of searching, integrating, etc., in relation to a large volume of unsorted or unclassified information can be cumbersome. By utilizing a system or a method to conduct an initial classification, the method may help reduce the size of the set of discrete informational elements to process.

The clustering and grouping of similar elements of information may be advantageous from the perspective of memory usage, bandwidth consumption, and/or a reduction in processing and/or computing complexity. There may be significant inefficiency and complexity as it relates to processing, searching, modifying or retrieving unstructured and/or unorganized information, and there may be significant benefits from applying one or more innovative techniques to provide an automated process for sorting and/or grouping similar data, especially in the advent of computer-implemented analysis and/or interpretation techniques, wherein computing devices may be leveraged in conducting large scale and/or iterative statistical analyses on massive data collections that otherwise would not have been possible.

For example, grouped and/or clustered information may facilitate various functionality utilizing the information, such as traversing and/or accessing the information (e.g., relevant information may be more easily located), performing actions on the information (e.g., transforming, extraction, loading into a data warehouse, sorting, statistical analysis, regression modelling, aggregation, reporting).

A significant amount of labour may be spent in determining which elements of information, tables, columns, records, etc., are similar and/or related. Accordingly, it may be desirable to have an efficient, and automated way of separating large collections of information into clusters of similar information. The clustering computationally pre-processes the large collections to append or associate clustering information onto the collections of information.

The clustering method is performed by configured hardware devices, including processors and memory which implement specific clustering engines and modules that are configured for increased efficiency in generating automated approximate classifications. The clustering method operates free of assertions relating to content associated with each electronic information element, and this may be an advantage relative to other methods as inherent biases that otherwise would be present may be avoided. A mechanical, computational count vector-based computational approach is different than a sorting exercise performed based on context, as the clustering is independent of any contextual meaning that may be derived from the content. Accordingly, in some scenarios, a more effective filtering/clustering mechanism can be provided.

These hardware devices are configured to receive the plurality of electronic information elements from data sources to extracting the machine encoded characteristics. Count vectors are extracted and distances are estimated between each pair of the count vectors. One or more data structures (e.g., a distance matrix data structure) is generated, and the data structure is used to populate a topology or tree, where each node represents an electronic information element and each linkage is adapted based on the aforementioned estimated distances based on statistical measures. In some embodiments, the methods described herein are implemented by way of executable code, including object code, interpreted code, or other high-level code, or a combination thereof.

Clustering can be effected on an ungrouped collection of electronic information items, and in some scenarios, electronic encoding mechanisms (e.g., optical character recognition) may be required to be performed prior to the performance of clustering. In some embodiments, the electronic encoding mechanisms may be specially configured to extract and encode count vectors, such as bigrams, tri-grams, tetra-grams, etc., such that the encoded document is more readily processed by downstream computational mechanisms. In some embodiments, the clustering is a step in an overall automated electronic document processing mechanism.

Clustering may also be effected on a monitored basis whereby new items of electronic information are added to existing clusters/new clusters having regard to an already clustered collection of electronic information.

Figure 1:
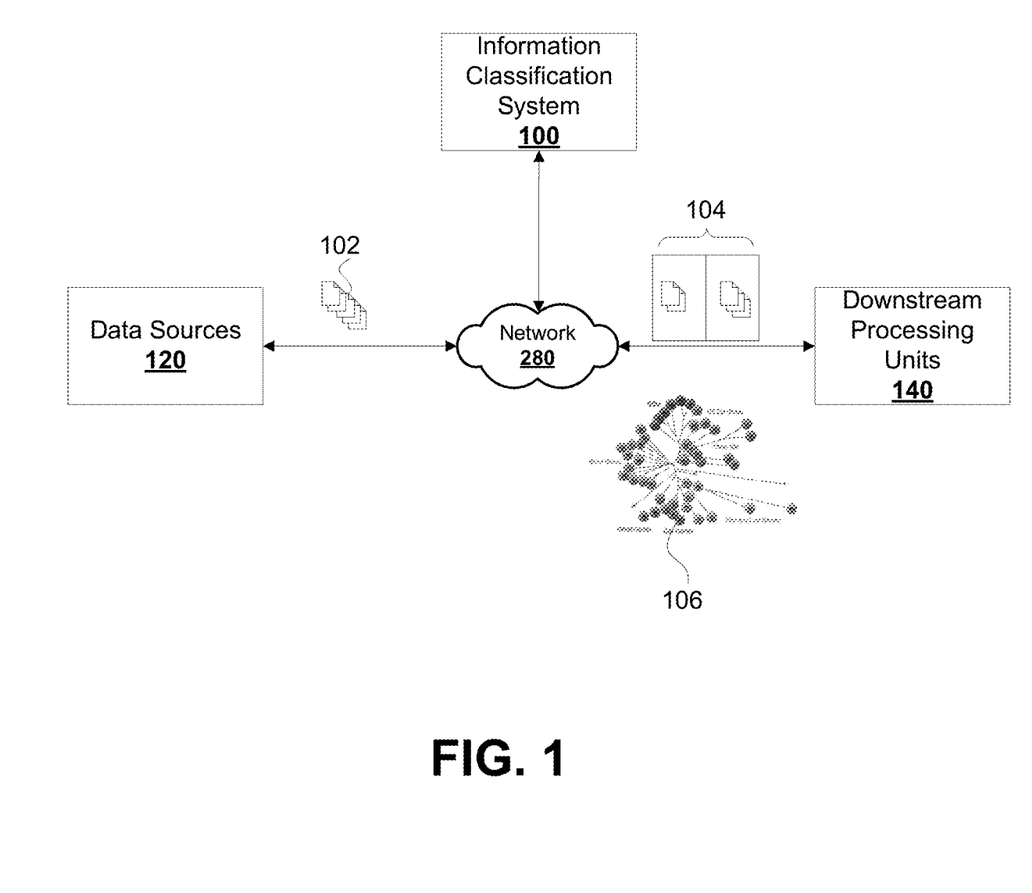
FIG. 1 is a block schematic diagram illustrating a system for processing text, according to some embodiments.

In the context of statistical and automated clustering, a technical challenge is the balance between available processing resources and accuracy of clusters/identification. There is a practical limit to the amount of processing resources available, including computing cycles, computing time, memory/cache sizes, and these constraints limit the depth and breadth of identification. Approaches are described in some embodiments that provide proposed solutions that utilize a specific n-gram-based implementation that utilizes statistical measure to estimate relationships between elements to computationally derive an estimated clustering. The accuracy of the estimated clustering may vary depending on the quality and type of inputs, as well as the availability of processing resources. FIG. 1 is a block schematic diagram illustrating a system for processing text, according to some embodiments.

The system 100 may be configured for facilitating the classification of elements of information 102 (e.g., documents, files, database records, media) in various formats (e.g., machine-encoded and/or machine-readable formats) to aid in the sorting and/or classifying of information. The system 100 may be configured to implement a computer-implemented method wherein an automated approximate classification may be conducted. The system 100 may be configured to merge separate collections of electronic elements of information 102 to generate aggregate collections for improved memory and processing efficiency.

The system 100 may be configured to receive data in the form of various machine-readable or encoded forms, such as in the form of electronic documents, database columns/records, or fields of data. The system 100 may then establish count vectors based on a processing of the received information, such as count vectors based on measures such as n-grams, discr-log encodings, among others.

These count vectors may be utilized for establishing or estimating distances based on statistical measures, using, for example, chi-square/G all-against-all techniques. The distances based on statistical measures are then utilized to generate a distance matrix and various techniques may be utilized (e.g., methods from Bioinformatics in Darwin or with tutoring-sample-documents added) to generate an ontology-tree (topology).

The ontology-tree may be configured having various parameters, and established for dynamic traversal or generation based, for example, on selecting very close distances, or grouping similar/identical data for searching (Multiple Source Searching [MSS]).

System 100 may be provided and implemented in various forms, for example, as a part of a database, a layer operating between a database and a data warehouse, a document management (DM) system, a software-as-a-service platform, and/or a cloud-based system, among others. System 100 may be provided in the form of a package or specially configured software/hardware that is adapted for information clustering using count vectors. Data storage may be configured to provide data structures adapted for storing clustering information and/or information elements and/or pointers, key, or metadata therein. These data structures can include among others hash trees, hash tables, tree structures, etc. In some embodiments, the specific data structure utilized provides an processing improvement. For example, a hierarchical tree structure with specifically designated node/linkage relationships provides improved traversal characteristics.

In the context of a system 100 operating in conjunction with a database, the database may include various records in a number of different arrangements, such as in the form of a relational database, a flat database, key-value, wide column, graph, or document structures, among others. In the context of a system 100 operating in conjunction or as part of a DM system, an interface may be provided wherein queries may be received and/or provided along with elements of information 102, and the system 100 may transform and/or process elements of information 102, for example, as part of a backend process, such that queries can be simplified based at least on an automated grouping and/or clustering of similar elements of information 102.

Queries, for example, may be provided by the interface through various election and/or search options. Topologies may be generated and/or clustering may be performed on new and/or existing data, for example, a new element of information may be received for grouping based on pre-existing and pre-clustered elements of information 102 (e.g., does it fit within the current set of identified clusters—if not, does it belong in a new cluster). Such an approach may be useful in the context of quickly classifying or pre-classifying a new element of information that may be received. For example, a law firm may be provided a new document and the system 100 may be configured to take a "first pass" at determining where the document should belong as it relates to pre-existing clusters of documents. Output may be provided in the form of results, variables, metadata, etc., to various APIs (e.g., for use with another system) or graphical user interfaces (GUIs) where the documents may be suitably arranged, for example, based on identified clusters, distances, etc., and in some embodiments, may be graphically demonstrated in the form of a graphical topology/ontology (e.g., a tree), where various characteristics of the graphical topology/ontology are indicative of various features (e.g., distances based on statistical measures).

Topologies/ontologies may be generated and/or clustering may be performed based on un-sorted and/or ungrouped elements of information 102. For example, if a law firm has several million documents, the documents may be input as elements of information 102 and a topology may be output by the system 100 through the interface. This topology/ontology may, for example, be utilized as a "first pass" sorting of documents useful in various contexts, such as conducting a pre-sorting of data as a pre-processing step prior to a more intensive data sorting and/or classification analysis, a "best efforts" type of grouping wherein manual and/or semi-manual approaches may not be warranted, and so on.

The automated grouping and/or clustering of similar elements of information 102 may be performed using automated, mechanical processes free of human intervention where a computing device performs computing functions to statistically perform determinations for sorting and/or classifying information based on machine interpretable/detectable patterns, characteristics, and/or aggregation of characteristics. Elements of information 102 may be stored in various forms of electronic information, which may have various characteristics, based, for example, on the encoding scheme utilized, associated metadata, etc., that may be automatically extracted and analyzed by the computing device (e.g., without a human making an assertion that a particular element of information 102 belongs to a group of element of information 102).

Elements of information 102 may be received from various sources 120. The elements of information 102 may be machine-readable and/or machine interpretable, for example, having encoding that enables a machine to extract characteristics from the elements of information 102, for example, the information may be encoded as bits and/or bytes of electronic information, such as media files, text strings, numbers, symbols, etc. The element of information 102 may be stored, for example, in the form of binary data, octal data, hexadecimal data, or various types of n-bit data, such as bytes. The space upon which the element of information 102 resides may be relevant in performing an automated analysis of the elements of information 102, for example, being indicative of the number of possibilities that a particular element of information 102 or portion thereof may have as potential polymorphs.

Count vectors may then be established based on a processing of the elements of information. The count-vectors may be utilized, for example, to identify a class of documents/column/field in databases. For example, information may be stored a string of characters having a number of possibilities for the n-grams (e.g., in the form of UTF-16 characters, each character providing a maximum of $2^{16}$ possibilities for each different character and for character pairs being analyzed, there may be $2^{16} \times 2^{16}$ possibilities). Other embodiments may include the generation of count vectors using discrete log methods, etc.

In some embodiments, the value of n can be varied, and different/parallel clustering approaches may be used to identify differences that arise if n=2, n=3, n=4, and so forth. For example, a user may select which value of n led to the most accurate clustering, as different values may have differing outcomes depending on the source data.

For every pair of count-vectors, a distance may be computed, using chi-square or another statistical measure. For example, the maximum likelihood G test may be used for computation of the distance. This distance may be utilized in performing classifications to form groupings 104 (e.g., clusters) based on identified similarities between aspects of information. The distances based on statistical measures can be input or provided in the form of a distance matrix.

The distance matrix may be processed in various ways to arrange, in the form of an informational topology/ontology 106 (e.g., a tree, a linked list, a directed graph) having various weights and/or indicia that may indicate, among other aspects, similar elements of information 102, the strength of determined similarity between elements of information 102, etc. The system 100 may be configured to provide this information to downstream processing units 140. The informational topology/ontology 106 may be hierarchical, and the relationships between connected nodes can be associated with linkage values to indicate the significance of relationships between the nodes.

Accordingly, where the informational topology/ontology 106 is hierarchical, there may be processing improvements for traversal where, for example, linkage values representative of statistical differences are utilized during traversal to obtain a potentially more accurate path optimization or path pruning. The hierarchical relationship may be particularly useful where the volumes of information are extremely large and it is impractical to conduct an analysis without applying heuristics to reduce the search space. Hash tables, trees, etc. may be utilized in some embodiments to further improve memory usage and/or speed.

For example, the groupings 104 (e.g., clusters) may be applied for use in relation to document and/or information intensive environments, where a large volume of individual elements of information 102 may need to be processed and/or otherwise grouped in relation to characteristics of the elements of information 102. As a non-limiting application, a law firm may have hundreds of thousands of documents and such a system 100 may be helpful in determining groupings 104 (e.g., clusters) of documents to reduce a computational and/or administrative burden in sorting through the documents. Similar approaches may also be used in relation to database records (e.g., transaction records, personal information, activity logs, monitored data), etc.

Various approaches may be utilized to statistically identify similarities, for example, counting of specific features, features of groups (e.g., pairs, triplets) of characters, etc. The approaches may also take into consideration metadata (e.g., tags) associated with the information. These approaches may be utilized to obtain (e.g., provision) a matrix of elements/features, or extracted information thereof.

For example, the count vectors may include counts of combinations of character strings (e.g., bigrams, trigrams, tetragrams, n-grams), and may depend on the number of bits utilized to encode the element of information. For example, a bigram of 8-bit characters (e.g., in ASCII form) may provide 256×256 possibilities for each bigram (e.g., $2^{8} \times 2^{8}$). These possibilities would be different if a different encoding scheme were used, for example, $2^{16} \times 2^{16}$ if UTF-16 is applied. The count vectors may then be processed to form a distance matrix, and the distance matrix may be transformed and/or processed such that a topology 106 (e.g., a tree, a mesh, a ring, a star) can be obtained through arranging the information based, for example, on relational and/or distances based on statistical measures between the elements of information 102. For example, a chi-squared (e.g., a chi-squared goodness of fit statistic) and/or other types of approaches may be utilized to determine these distances based on statistical measures.

The topology/ontology 106 may be generated such that a plurality of nodes and a plurality of linkages between nodes of the plurality of nodes are provided, and each node of the plurality of nodes represents an electronic information element and each linkage of the plurality of linkages is adapted based on the estimated one or more distances based on statistical measures between the each of the plurality of matrices. The matrices may be stored on specially configured data structures to improve computational speed, and matrix representation approaches may be selected based on the specific type of topology/ontology 106 used. For example, representations include row major representations, sparse matrix representations, and Morton order matrix representations.

In some embodiments, the topology/ontology 106 is utilized to cluster and/or group the nodes to provide an automated grouping of nodes based on the distances based on statistical measures. For example, determined similarities may be utilized for determining the clusters and arranging the nodes such that estimated groupings may be useful despite not making any assertions about the actual content of the information provided. For example, some embodiments involve the use of purely mechanical comparison means (e.g., comparing distances between character pairs and/or counts) to estimate groupings (rather than the system 100 making any assertions what the meaning of the content of the information). In some embodiments, the one or more clusters are identified by grouping nodes having a distance based on statistical measures between the nodes below a pre-defined threshold distance. In some embodiments, the classifications estimated by the system 100 may be appended onto the received information in the form of metadata or other type of electronic tag/classification.

Other identified and/or determined relationships can be used for arrangement and/or grouping, for example statistical similarities, etc. In some embodiments, the topology 106 and/or elements of information 102 may be compared against information extracted from known data sets (e.g., addresses, postal codes, information encoding schemes, protocols) to aid in the classification of information.

In some embodiments, the system 100 may be configured for machine-learning and/or machine-based feedback in relation to classification. For example, feedback provided from subsequent systems and/or reviewers of output may be received by the system 100 to refine the metrics, thresholds, and/or logical rules applied to generate classifications. Such feedback may be, for example, indicative of true positives, false positives, true negatives, and/or false negatives. In adjusting metrics, thresholds, and/or logical rules applied to generate classifications, there may be, for example, different weightings (e.g., adjusted up and/or down) applied to different determinations, adjusted statistical thresholds, etc. The feedback and/or accuracy rate may be monitored over a period of time and/or with existing and/or future data sets to determine whether such adjustments have an overall positive and/or an overall negative effect over a duration of time.

In some embodiments, the system 100 may interoperate with a user interface to graphically display the topology and/or groupings. For example, system 100 may be utilized to apply different thresholds and/or criteria, allowing a potential user to modify parameters involved in the estimation to review potentially different topologies (to, for example, determine an optimal threshold). In some embodiments, the system 100 may also be configured to cause various actions to be performed downstream processing units 140. For example, alerts, notifications, triggers, etc., may be generated and/or triggered depending on outputs obtained regarding the elements of information 102.

The system 100 may be implemented using computing technologies, such as servers having processors, associated memory (e.g., non-transitory computer-readable memories), interfaces (e.g., input/output interfaces, application programming interfaces [APIs]), and/or data storage (e.g., databases, hard disk drives, solid state drives, digital storage media, analog storage media).

In some embodiments, the system 100 may be provided in the form of a cloud-computing architecture, facilitating activities using a set of distributed networked resources that may be utilized on demand based on computing requirements of the system 100. Further, the system 100 may be provided in the form of instructions on computer-readable media, which, when executed, cause one or more processors to perform various steps and/or execute programming code.

The system 100 may be, for example, provided as an on-site server, an off-site server, a "cloud" based service, a plug-in for a document management system 100, and/or integrated into other software and/or hardware, such as a database software (e.g., a tool in a database system 100). Integration with database software may be advantageous where the system 100 may be used, among other tasks, to perform analysis of columns and/or records in a database. In some embodiments, the system 100 may be provided as an application that may be utilized in conjunction with existing stores of information (e.g., a database, a business intelligence warehouse, a data warehouse).

Accordingly, the system 100 may provide an automated tool and/or applications that may be used for various types of classification and/or analysis wherein little to no human input is required and rather, an automated approach is used to classify information without any assertion or a priori knowledge of the type of information contained in the elements of information 102 provided. Such a system 100, for example, may be used in conjunction with or in association with manual, semi-manual and/or other automated techniques for classification (e.g., the results may be reviewed, approved, rejected, re-sorted following automatic classification).

In some embodiments, the system may be provided in the form of a cloud-based implementation using distributed computing resources in concert to conduct clustering identifications.

Figure 2:
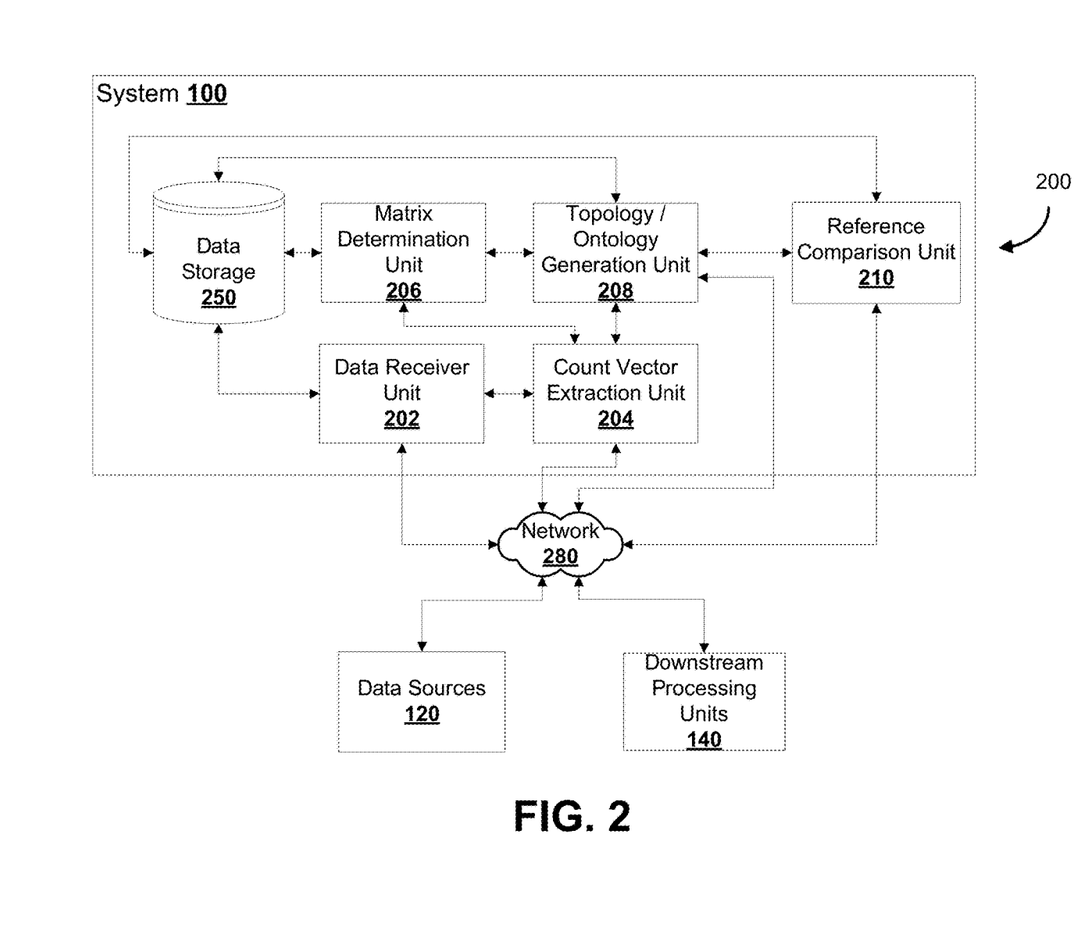
FIG. 2 is a block schematic diagram illustrating components and/or units for a system for processing text, according to some embodiments.

FIG. 2 is a block schematic diagram illustrating components and/or units for a system for processing text, according to some embodiments.

The system 100 may be comprised of various units, such as an data receiver unit 202, an count vector extraction unit 204, a matrix determination unit 206, a topology generation unit 208, and a reference comparison unit 210. In some embodiments, one or more interfaces 212 may be utilized to connect and/or communicate with various external components and/or systems, such as data sources 120, or downstream processing units 140. The interfaces 212 may connect through network 280, for example. Data sources 120 may be a disparate set of data sources 120, which may provide information that may have suboptimal consistency and/or crude groupings (e.g., for example, records recorded by human operators).

The data receiver unit 202 may receive information provided from various sources 120, such as, for example, strings (e.g., text strings, individual characters), numbers, binary information (or octal, hexadecimal), symbols, dates, formulas, fractions, percentages, logical expressions, raw data, images, machine-executable code, binary code, markup languages (e.g., extended markup language), etc.

The data receiver unit 202 may, for example, receive a new document that may be classified into existing groups, or provided into a new group upon an appropriate determination (e.g., in response to a "search request"). In this example, the specific grouping and/or identified cluster may be an output from the system 100.

The data receiver unit 202 may also, for example, receive one or more existing documents that need to be classified, with the particular groupings, topologies, and/or clustering provided as an output from the system 100 (e.g., in response to a "grouping request").

In some embodiments, the information received by the data receiver unit 202 may be delimited and/or otherwise segmented, for example, indicative of where one element of information begins and another ends.

The count vector extraction unit 204 may be configured to extract count vectors from the received data. For example, if information related to addresses is provided in the form of comma separated values, the elements of information 102, in some embodiments, may be extracted and processed by the count vector extraction unit 204 based on the delimitations provided by the commas. In an example where database information is being extracted, the count vector extraction unit 204 may be configured to extract count vectors from information from specific records, from specific columns, etc.

The matrix determination unit 206 may be configured to process the count vectors in determining one or more distance matrices linking the elements of information. These distance matrices may be generated based on various parameters and desired matrix characteristics. The distance matrices are utilized by topology/ontology generation unit 208 in generating various classification trees or toplogies.

The system may interoperate with and/or through data storage 250 and network 280. For example, data storage 250 may be provided for storing various aspects of data related to the facilitation of the generation of the one or more topologies/ontologies 106, such as, for example, storing data received by data receiver unit 202, storing count vectors extracted by count vector extraction unit 204, the matrices determined by matrix determination unit 206, one or more topologies 106, and/or identified relationships between elements of information 102. In some embodiments, the reference information utilized by the reference comparison unit 210 may be stored on data storage 250, and/or accessed over the network 280.

The network 280 may be provided as an intermediary for interactions between various sources and/or output devices, etc. The network 280 may be a wide area network, a local area network, the Internet, etc., and may be provided through various networking technologies, such as routers, switches, interface controllers, access points, etc.

Figure 3:
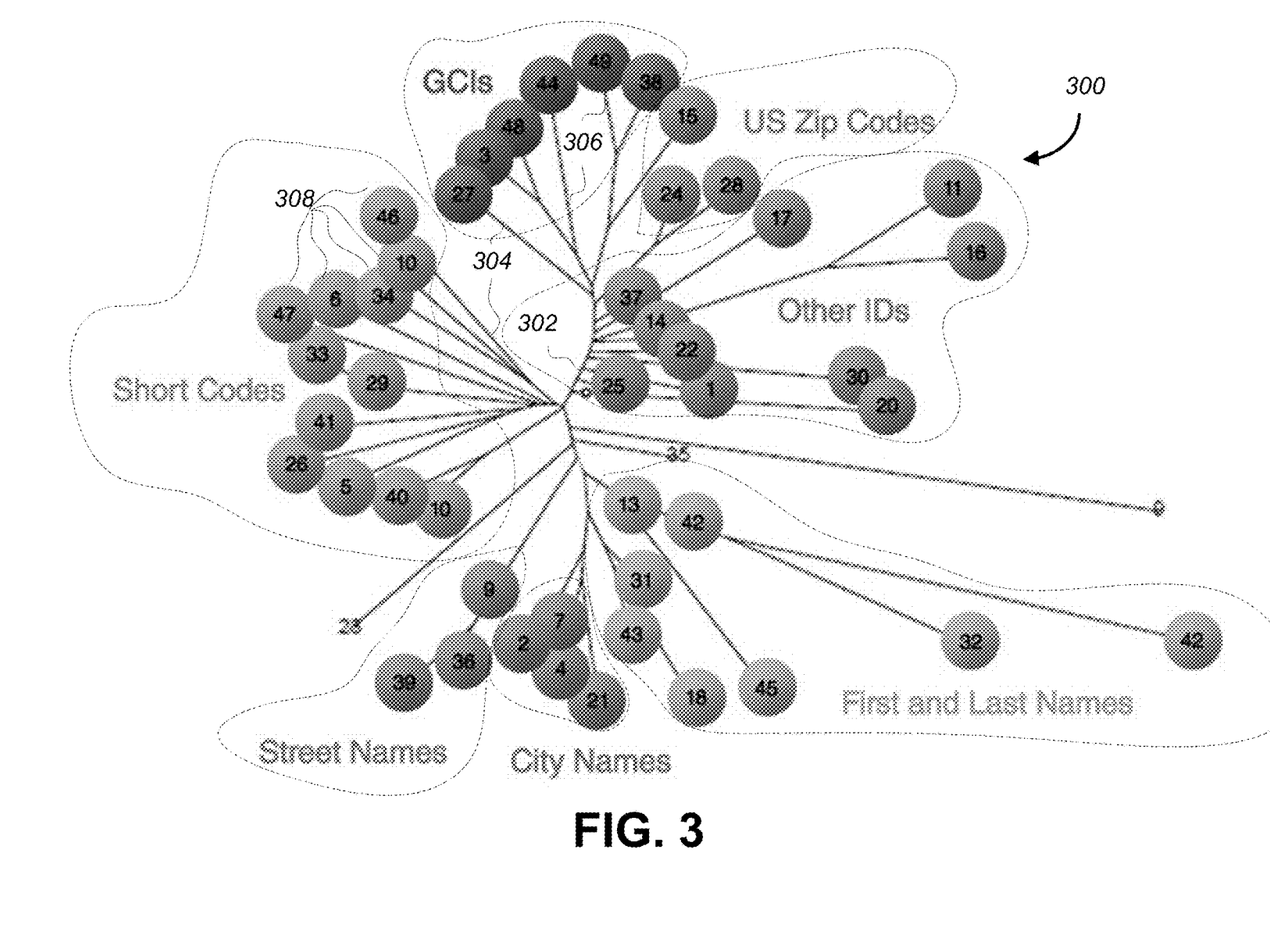
FIG. 3 is a classification diagram illustrating a sample classification for classifying members of a collection of texts into clusters, according to some embodiments.

FIG. 3 is a classification diagram illustrating a sample classification for classifying members of a collection of texts into clusters, according to some embodiments.

Information may be provided in various forms, such as strings (e.g., text strings, individual characters), numbers, binary information (or octal, hexadecimal), symbols, dates, formulas, fractions, percentages, logical expressions, raw data, images, machine-executable code, binary code, markup languages (e.g., extended markup language), etc. Information may be delimited and/or segmented, for example, in the form of comma separated values, etc.

The information may be encoded to have various meanings and may be structured such that there is compliance with a schema and/or various rules/constraints related to the structure and/or content of the information. For example, there may be syntactical constraints, grammatical rules, specific ordering, required predicates, rules governing the content of elements and attributes, and/or referential information (e.g., identification numbers, references of foreign/unique/primary/secondary keys), among others.

In this example, the classification diagram is provided wherein a tree structure is described that resulted from the analysis of several columns of information stored on a database, and the information was related to addresses, name, city names, postal codes, etc.

The tree structure is generated based on identified relationships derived from processing the elements of information to identify and/or infer statistical relationships that may be indicative of whether the elements of information should be grouped and/or clustered together.

As depicted in FIG. 3, there may be a main "trunk" 302, having various branches 304, sub branches 306, and end nodes 308. This structure/tree topology shown is a non-limiting example, and other types of topologies or different topologies may be possible (e.g., having more than one trunk 302, a different structure of branches 304, sub-branches 306, and end nodes 308).

Various characteristics may be assigned to one or more nodes 308 representing individual elements of information.

For example, as depicted in FIG. 3, the informational nodes may be color coded to show how the group of similar columns cluster together, and the branches, sub-branches (and potentially sub-sub branches) may be arranged such that relationships between nodes of information may be discerned. Other types of indicia may be utilized aside from color, for example, a weighting may be applied.

Figure 4:
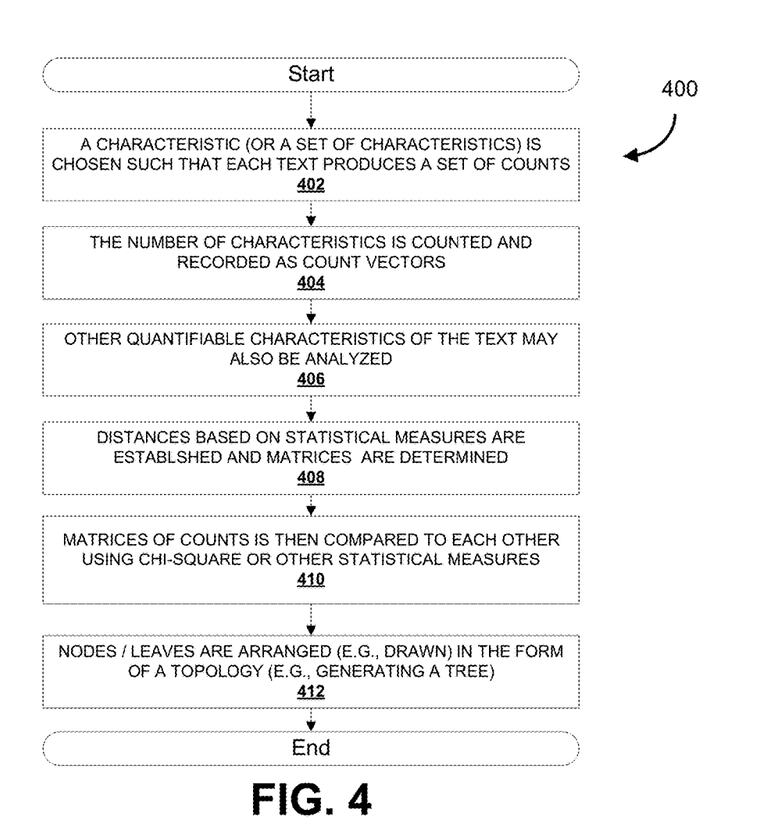
FIG. 4 is a sample workflow diagram depicting steps of a sample method for classifying members of a collection of elements of information into groupings (e.g., clusters), according to some embodiments.

FIG. 4 is a sample workflow diagram depicting steps of a sample method for classifying members of a collection of elements of information into groupings 104 (e.g., clusters), according to some embodiments.

FIG. 4 is an illustrative example and there may be other, different, more, less, alternate steps in the method, and the steps may be performed in various orders, permutations, and/or combinations. FIG. 4 illustrates steps of a statistical method to classify members (e.g., member texts) of a collection of information (e.g., a collection of text) into clusters. An example statistical method, in accordance with some embodiments, is a chi-squared technique.

A member (e.g., a member text) can range from a single document to the contents of a column in a database table. The classification may, for example, indicate which documents or columns may be most closely similar to each other, without (e.g., free of) making any assertion about the actual contents of the document or column. For example, a text processing and/or classification method may include counting one or more simple characteristic(s) of the text.

In this example, the information to be analyzed is a collection of text strings, each text string being formed of characters, which, for example, may be encoded as 8-bit characters (8-bit is chosen as an example and other types of character encoding may be applied, such as UTF-16, UTF-32, GB18030, Morse codes, Baudot codes, HTML encoding, ISO 8859, among others).

At 402, a characteristic (or a set of characteristics) may be chosen such that each text produces a set of counts. A statistical measure may then applied be to determine the similarity of sets of counts associated with each pair of texts.

The characteristic being counted may be pairs of characters, otherwise known as bigrams. Counts may be stored in the form of count vectors.

At 404, the number of characteristics may be counted. In a non-limiting example where pairs of characters are being counted (e.g., bigrams are counted), in the word 'text', there are 3 bigrams, 'te', 'ex', 'xt'.

For example, step 406 may be undertaken where other quantifiable characteristics of the text may also be analyzed, for example, such as various metrics of the text length, associated metadata, the presence of predicates, etc. Various other quantifiable characteristics may be identified, analyzed, and processed.

At 408, one or more matrices of counts may be determined based at least on distances based on statistical measures determined between various count vectors.

At 410, these matrices of distances based on statistical measures may then be compared to each other using chi-square or some other statistical measure.

At 412, the different documents or columns may be then arranged (e.g., drawn) in the form of a topology (e.g., generating a tree), where the distance along a branch (e.g., an edge of a graph) indicates the relative difference between nodes on the tree (e.g., or vertices of a graph). In some embodiments, the technique may be extended to use any n-grams or multi-byte character encodings. In some embodiments, the relationships may be bi-directional, and in other embodiments, the relationships are uni-directional. In some embodiments, the relationships are same for both directions, and in other embodiments, different relationships may exist for different directions on the linked graph.

In a tree topology example, to build the trees, a matrix of all the chi-squared distances between each element of information (e.g., a column/document/element) may be computed. These distances may be the all-against-all distances between all columns/documents.

For example, from the matrix, and using various tree-building algorithms (e.g., including those derived from bioinformatics), a phylogenetic tree from the distance matrix may be generated. In some embodiments, the phylogenetic tree from the distance matrix may be established by applying a NJ (Neighbor Joining) algorithm.

An example tree may have at the leaves (e.g., nodes), the names of the columns/documents and the internal structure may reflect the structure/relations between them. On the tree, the distances between leaves may be a close approximation to the distances of the matrix. By selecting subtrees of this tree, a hierarchical classification of columns/documents may be provided.

In some embodiments, the development of the linked graph (e.g., a tree or an ontology) may be configured to use any n-grams or multi-byte character encodings. Bigrams, tri-grams and tetra-grams may be used, as well as, statistical information about the text itself. This can include various metrics of the text as text length and other quantifiable characteristics of the text (e.g., including metadata, word counts, character counts, distance between characters, the presence of keywords).

Although the system does not, on its own, make any assertion about the content of the text, in some embodiments, a library of 'standard' counts for common text elements such as dates, phone numbers, social security numbers (SSNs), etc. is provided for comparison and/or reference template purposes, among other purposes.

In some embodiments, at 414, the method further utilizes and/or cooperates with a library having 'standard' counts for common text elements such as dates, phone numbers, SSNs, etc. The method may be utilized in various contexts and applications, such as, (1) for example, the classification of documents, and (2) the classification of columns in a relational database. As an output, a topology or other type of identification of relationships may be determined indicative of how the system has statistically grouped and/or classified information based on its analysis.

This identification of relationships may be helpful in providing a "first pass" at sorting information, clustering elements of information that appear to be related to one another such that the group of information may be fully sorted (in some cases, especially where there are distinct and differences between the elements of information), or semi-sorted (e.g., where there may be some inconsistencies and/or ambiguity in relation to how the information is structured).

At 416, the statistically grouped and/or classified information may be provided to a downstream process for further processing and/or analysis, such as verification by a human, validation in a data warehouse, data warehousing operations (e.g., extraction, transformation, and loading of information), etc.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

As an illustrative example, consider the following three columns:

Column 1, EmployeeAge: [50,38,25,35,59,33]

Column 2, EmployeeIncome: [62550.00, 45739.50, 39825.00, 50309.75, 76744.33, 45698.20]

Column 3, MaxTemperature: [25,23,17,23,28,30]

The encodings of the values and the count vectors can be:

EmployeeAge:

p14→1 p15→1 p16→2 p18→1 p19→1

EmployeeIncome:

p54→1 p55→2 p56→1 p57→1 p58→1

MaxTemperature:

p12→1 p13→2 p14→2 p15→1

The Chi-square test between EmployeeAge and EmployeeIncome can be 12.0. The Chi-square test between EmployeeAge and MaxTemperature can be 7.3, and so on.

The corresponding distance matrix is:

|        | Age  | Income | MaxT |
|--------|------|--------|------|
| Age    | 0.0  | 12.0   | 7.3  |
| Income | 12.0 | 0.0    | 12.0 |
| MaxT   | 7.3  | 12.0   | 0.0  |

Embodiments described herein can build a distance tree with this distance matrix to give a tree which has Age and MaxT closer than Income. This is an illustrative example.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer-implemented method for merging electronic data collections maintained in an electronic document management system, using an automated approximate classification of a plurality of electronic information elements each corresponding to an electronic document maintained in the electronic document management system, each electronic information element of the plurality of electronic information elements having one or more machine encoded characteristics, the method comprising:
   receiving the plurality of electronic information elements from a data source;
   extracting the one or more machine encoded characteristics from each one of the electronic information elements;
   provisioning a plurality of count vectors based at least on the one or more extracted machine encoded characteristics, each count vector of the plurality of count vectors corresponding to one of the electronic information elements, each count vector formed from a n-gram selected from a plurality of n-grams representing counts of every possible n-gram for a character encoding mapping;
   estimating one or more distances based on statistical measures between each pair of the count vectors;
   generating a matrix of the distances based on the statistical measures between each pair of count vectors;
   generating a topology or tree, having a plurality of nodes and a plurality of linkages between those nodes, wherein each node represents an electronic information element and each linkage is adapted based on the aforementioned estimated distances based on statistical measures, wherein the plurality of linkages and the plurality nodes are generated and arranged in the topology or tree such that one or more clusters of electronic information elements may be identified, each such cluster indicative of determined similarities between the electronic information elements composing the cluster free of assertions relating to content associated with each electronic information element; and
   applying the automated approximate classification to each of the electronic information elements to facilitate a reduction in downstream processing complexity, the automated approximate classification representing a preliminary classification of at least one document maintained in the electronic document management system.

2. The method of claim 1, wherein automatically estimating the one or more distances based on statistical measures between each pair of count vectors includes using at least a chi-squared goodness of fit statistic.

3. The method of claim 1, further comprising:
   comparing the topology or the tree and the one or more clusters against a reference database indicative of a reference standard.

4. The method of claim 1, wherein the topology or the tree is adapted to identify the one or more clusters by grouping nodes having a distance based on statistical measures between associated pairs of count vectors below a pre-defined threshold distance based on statistical measures.

5. The method of claim 1, wherein the one or more extracted machine encoded characteristics includes at least counts of characters and the extracted machine encoded characteristics are represented in the corresponding count vector as a compressed string.

6. The method of claim 1, wherein the character encoding mapping is at least one of UTF-8 or UTF-16 and there are $2^8$ or $2^{16}$ possibilities for each character, respectively.

7. The method of claim 1, wherein n=2 and the one or more extracted machine encoded characteristics are bigrams.

8. The method of claim 1, wherein n=3 and the one or more extracted machine encoded characteristics are trigrams.

9. The method of claim 1, wherein n=4 and the one or more extracted machine encoded characteristics are tetragrams.

10. The method of claim 1, wherein the topology is an ontology.

11. A computer-implemented system configured to merge electronic data collections maintained in an electronic document management system, using an automated approximate classification of a plurality of electronic information elements each corresponding to an electronic document maintained in the electronic document management system, each electronic information element of the plurality of electronic information elements having one or more machine encoded characteristics, the system including one or more processors, having one or more non-transitory computer readable memories and data storage, the non-transitory computer-readable media memories including electronic instructions, which when executed, cause the one or more processors to:
  receive the plurality of electronic information elements from a data source;
  extract the one or more machine encoded characteristics from each one of the electronic information elements;
  provision a plurality of count vectors based at least on the one or more extracted machine encoded characteristics, each count vector of the plurality of count vectors corresponding to one of the electronic information elements, each count vector formed from a n-gram selected from a plurality of n-grams representing counts of every possible n-gram for a character encoding mapping;
  estimate one or more distances based on statistical measures between each pair of count vectors;
  generate a matrix of the distances based on the statistical measures between each pair of count vectors;
  generate a topology or tree, having a plurality of nodes and a plurality of linkages between those nodes, wherein each node represents an electronic information element and each linkage is adapted based on the aforementioned estimated distances based on statistical measures, wherein the plurality of linkages and the plurality nodes are generated and arranged in the topology or tree such that one or more clusters of electronic information elements may be identified, each such cluster indicative of determined similarities between the electronic information elements composing the cluster free of assertions relating to content associated with each electronic information element; and
  apply the automated approximate classification to each of the electronic information elements to facilitate a reduction in downstream processing complexity, the automated approximate classification representing a preliminary classification of at least one document maintained in the electronic document management system.

12. The system of claim 11, wherein to automatically estimate the one or more distances based on statistical measures between each of the pair of count vectors includes using at least a chi-squared goodness of fit statistic.

13. The system of claim 11, wherein the non-transitory computer-readable media memories including electronic instructions, which when executed, further cause the one or more processors to compare the topology or tree and the one or more clusters against a reference database indicative of a reference standard.

14. The system of claim 11, wherein the topology or tree is adapted to identify the one or more clusters by grouping nodes having a distance based on statistical measures between the nodes below a pre-defined threshold distance.

15. The system of claim 11, wherein the one or more extracted machine encoded characteristics includes at least counts of characters and the extracted machine encoded characteristics are represented in the corresponding count vector as a compressed string.

16. The system of claim 11, wherein the one or more extracted machine encoded characteristics are n-grams.

17. The system of claim 11, wherein n=2 and the one or more extracted machine encoded characteristics are bigrams.

18. The system of claim 11, wherein n=3 and the one or more extracted machine encoded characteristics are trigrams.

19. The system of claim 11, wherein n=4 and the one or more extracted machine encoded characteristics are tetragrams.

20. A non-transitory computer readable medium having instructions stored thereon, which when executed, cause a processor to perform steps of a method for merging electronic data collections maintained in an electronic document management system, using an automated approximate classification of a plurality of electronic information elements, each corresponding to an electronic document maintained in the electronic document management system, each electronic information element of the plurality of electronic information elements having one or more machine encoded characteristics, the method comprising:
  receiving the plurality of electronic information elements from a data source;
  extracting the one or more machine encoded characteristics from each one of the plurality of electronic information elements;
  provisioning a plurality of count vectors based at least on the one or more extracted machine encoded characteristics, each count vector of the plurality of count vectors corresponding to one of the electronic information elements, each count vector formed from a n-pram selected from a plurality of n-grams representing counts of every possible n-gram for a character encoding mapping;
  provisioning a plurality of matrices based at least on the one or more extracted machine encoded characteristics, each matrix of the plurality of matrices corresponding to one of the plurality of electronic information elements and each matrix storing the distances based on the statistical measures between each pair of count vectors;

automatically estimating one or more distances based on the statistical measures between each of the plurality of matrices based on the stored distances between each pair of count vectors;

generating a topology or tree having a plurality of nodes and a plurality of linkages between nodes of the plurality of nodes, wherein each node of the plurality of nodes represents an electronic information element and each linkage of the plurality of linkages is adapted based on the estimated one or more distances based on statistical measures between the each of the plurality of matrices; and wherein the plurality of linkages and the plurality of nodes are generated and arranged in the topology or tree such that one or more clusters of electronic information elements may be identified, each cluster of the one or more clusters of electronic information elements indicative of determined similarities between the electronic information elements composing the cluster free of assertions relating to content associated with each electronic information element of the plurality of electronic information elements; and applying the automated approximate classification to each of the plurality of electronic information elements to facilitate a reduction in downstream processing complexity, the automated approximate classification representing a preliminary classification of at least one document maintained in the electronic document management system.

\* \* \* \* \*